Aug. 29, 1961  C. W. CHILLSON  2,998,079
AIRCRAFT PROPELLER MOUNTING
Filed Sept. 2, 1958
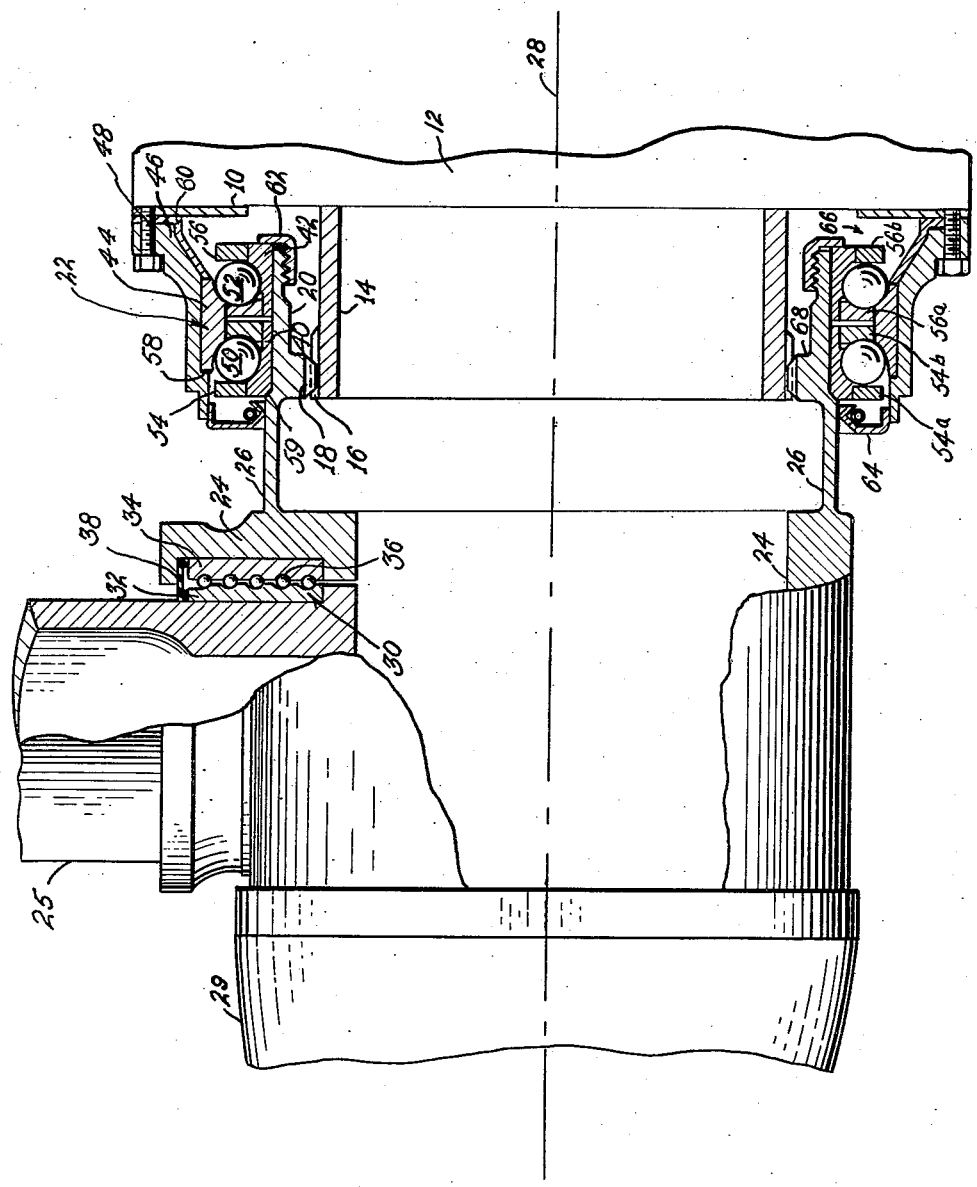
INVENTOR
CHARLES W. CHILLSON
BY
William V. Ebs
his ATTORNEY

2,998,079
AIRCRAFT PROPELLER MOUNTING
Charles W. Chillson, Packanack Lake, N.J., assignor to Curtiss-Wright Corporation
Filed Sept. 2, 1958, Ser. No. 758,495
4 Claims. (Cl. 170—135.7)

My invention relates to an improvement in the mounting of aircraft propellers.

Originally, it was the practice in mounting propellers on aircraft engines to merely fasten a propeller upon the rotating drive shaft extending from the engine housing. This type of mounting had disadvantages in that the propeller shaft was carried by bearings within the engine, which bearings had to assume thrust loading, and also hold the propeller and shaft against bending loads produced by gyroscopic effects and by vibration induced loads of various sorts which tended to bend the propeller shaft as a beam. Various schemes were proposed to improve upon this type of mounting, one such scheme being that shown, for example, in Patent No. 2,727,577 of R. T. DeMuth issued December 20, 1955. In such schemes the propeller is commonly driven through a splined or geared connection between the engine shaft and the propeller hub, and the propeller is supported by radial and thrust bearings located between hub structure and structure secured to the massive engine structure. A plurality of radial bearings and one or more thrust bearings are utilized to take radial and thrust loads, and additional means are provided to take up any movements of the hub structure tending to cause misalignment between the propeller axis and the axis of the engine drive shaft. While such improved schemes have merit and constitute an advance in the propeller art they have increased the complexity of the propeller mountings over those originally employed. An arrangement having not only the advantages of the improved type of mountings described, but also being simple in construction and therefore, also reduced in weight and cost would, of course, be highly desirable. Indeed, a prime object of this invention is to provide such an arrangement.

A particular object of the invention is to provide an improved simplified propeller mounting in which radial deflections due to centrifugal forces acting on the propeller blades are isolated from a main bearing structure rotationally supporting the propeller.

Other objects and advantages of the invention will become apparent during a reading of the specification taken in connection with the drawing.

The hub of a propeller is subjected to radial forces of considerable magnitude due to the centrifugal action of the propeller blades. In attaining the objects and advantages of the invention these forces and the deflections which they produce, are isolated from a main bearing structure rotationally supporting the propeller by providing a flexible connection between the propeller hub and structure in contact with the said main bearing structure. The bearing structure is arranged to provide a bearing diameter of substantial size, preferably of the same order of magnitude as the diameter at which the propeller blades are secured in the hub, such that the distribution of thrust and bending forces including IXP vibration forces which act on the bearing is maximized with the result that multiple bearing structures are unnecessary, and a direct path is provided for the transfer of these forces to the bearing. IXP vibration is a mode of vibration due to aerodynamic effect on blades which tends to bend the propeller shaft in an upward or downward direction, the direction of the bending tendency being constant and the frequency being at propeller speed.

The invention may be more fully appreciated by considering the description which follows in connection with the attached single figure of the drawing, which is a somewhat diagrammatic sectional view of a propeller mounting including the features of the invention.

Referring to the drawing, reference character 10 designates a structural portion of the engine or powerplant 12 of an aircraft. This structural portion 10 is non-rotating and should be of such strength and rigidity as to be capable of supporting an entire propeller and associated parts; and all thrust and bending loads including IXP vibration loads, resulting from the operation of such propeller.

A hollow shaft 14 extending from the powerplant represents the engine drive shaft. This shaft 14 drives the propeller through splines 16 and 18 located on the shaft and on a flanged portion of structure 20 respectively. The structure 20 which is concentric with respect to shaft 14 is rotationally mounted on the main bearing structure 22 of the propeller. Structure 20 which is rotated by the shaft 14 drives the propeller hub 24 through cylindrical structure 26 shown integrally connected with structure 20 and hub 24. The hub 24 rotates the blades 25 of the propeller about the propeller axis 28, the blades being suitably secured in the hub structure for this purpose. The spinner 29 is also rotated about the axis 28 which is located forward of the blade. For reasons which will become apparent hereinafter the structure 26 should be readily flexible radially and should be made sufficiently thin to achieve this result while maintaining the capability of the part to transmit large torque forces to the propeller hub without buckling or undue twisting.

The propeller blades 25, only one of which appears in the drawing, which depicts a three-bladed propeller, are preferably each mounted in the hub in a thrust bearing 30 arranged to prevent the blades from moving relative to the hub in a radial direction, but permitting rotation of the blades in the hub about an axis substantially perpendicular to the propeller axis 28 so that blade pitch changes may be accomplished. The bearing 30 comprises bearing races 32 and 34 disposed against the blade and hub structure respectively, and the ball bearings 36 located between the races. A resilient seal 38 is preferably provided over the bearing 30 between the propeller blade and hub structure. Conventional means may be utilized for regulating and accomplishing pitch changes of the propeller blades 26. Such means, however, do not constitute a part of the present invention and are therefore not shown in the drawing.

The main bearing structure 22 hereinbefore referred to is disposed between rotatable structure of the propeller, specifically the structure 20, and non-rotating engine structure 10. As shown, the structure 20 contacts inner races 40 and 42 of the bearing structure, whereas the outer race 44 of the bearing contacts a member 46 which is secured as by bolts 48 to engine portion 10. The bearing structure includes a double row of balls 50 and 52, the balls 50 of one row being distributed circumferentially in cage 54 between side walls 54a and 54b, and the balls 52 of the other row being distributed in like fashion in the cage 56 between side walls 56a and 56b. The bearing parts are restrained from longitudinal movement by the engagement of the left ends (as viewed in the drawing) of outer race 44 and inner race 40 with ridges 58 and 59 respectively on structures 46 and 20, and the engagement of the right ends of outer race 44 and inner race 42 with member 60 and end ring 62 respectively, the member 60 being secured by bolts 48 between the member 46 and engine portion 10, and the ring 62 being in threaded engagement with structure 20. A seal 64 is provided at one end of the bearing structure, whereas a passage 66 is provided at the other end of the structure for admitting lubricating oil to the bearing parts.

Centrifugal forces of considerable magnitude act upon the blades of a propeller and are imparted to the propeller hub tending to cause the hub to expand radially. The usual practice is to restrain this expansion and to design bearing structures rotationally supporting the propeller to assume the restraining forces. In accordance with the invention, however, radial expansion of the hub is permitted. Centrifugal forces are allowed to cancel out in the hub structure and there are, therefore, no restraining forces of substantial magnitude which need be imparted to the bearing structure 22. Radial expansion of the hub and isolation of the centrifugal forces from the bearing structure 20 are results due to the radial flexibility of thin cylindrical connection 26. Such thin cylindrical connection, which is located between the more massive hub 24 and stiffened structure 20, reflects all radial movements of the hub while structure 20 maintains a fixed radial distance from the propeller axis, and substantially no loading of the bearing structure 22 results from the centrifugal action of the propeller blades. This is a significant feature of the invention. The structure 20 is stiffened by the flange 68.

Accordingly the bearing structure 22 need only withstand thrust and bending loads. Thrust loads are borne by one row of balls or the other according to the direction of the load, the areas of contact of the inner races 40 and 42 of the bearing structure and of the outer race 44 with the balls being so located that the balls 50 bear a thrust load directed to the right as viewed in the drawing, and the balls 52 bear a thrust load directed to the left. Bending loads are distributed between the two rows of balls. Because the thin connection 26 is flexible relative to structure 20, movements of the propeller due to bending loads such as caused by IXP vibrations are taken up in the connection 26 and the radial distance of structure 20 from the propeller axis is not altered by these forces. Bearing wear due to such bending forces is minimized as a result and a more equal distribution of these forces between the two rows of balls 50 and 52 is assured. Since the radial distance of structure 20 from the propeller axis is not affected either by centrifugal forces acting on the propeller blades or by forces tending to bend the propeller as a beam, there is no impairment of the driving connection between splines 16 and 18 on shaft 14 and structure 20 respectively during operation of the propeller. The thrust and bending loads borne by the bearing structure 22 are transmitted to the massive engine structure through parts 46, 60, and 10.

The improved construction for a propeller mounting shown and described herein provides for the location of bearing structure 22 at a substantial distance from the propeller axis. The bearing structure 22 should be on a line parallel to the propeller axis and extending through the thrust bearing 30. Preferably the distance from the propeller axis to the center of the balls of bearing structure 22, corresponds approximately to the average radius, similarly measured, of the propeller thrust bearing. With the bearing structure 22 located a substantial distance from the propeller axis in line with the thrust bearing instead of in fairly close proximity to said axis as is commonly done, the load to be sustained at any particular location around the bearing is considerably reduced and a direct path is provided for the transfer of thrust and bending forces to the bearing.

It will be now apparent that the invention provides for an improved and simplified construction for mounting propellers. In accordance with the invention radial loads due to centrifugal forces acting on the propeller blades are isolated from the main bearing structure rotatably mounting the propeller. Bearing wear due to bending forces is minimized and equal distribution of such forces between the balls of the bearing structure is provided for. The location of the bearing structure is such that loading of the bearing is minimized. By reason of the advantages achieved with the arrangement described multiple bearing structures such as commonly employed are not required for supporting the propeller, only the single bearing structure 20 being required for this purpose.

While only one embodiment of the invention has been shown it will be understood by those skilled in the art that other embodiments are possible and that various changes and modifications may be made within the scope of the claims without departing from the spirit and scope of the invention.

I claim:
1. The combination comprising, a rotatable hub for an aircraft propeller, propeller blades secured in the hub, structure extending from the hub radially flexible at least in part, other structure securable in a fixed position on an engine, bearing means between said extending structure and said other structure for rotatably supporting the propeller hub, and driving means operatively connected to said extending structure for rotating the hub.

2. The combination comprising, a rotatable hub for an aircraft propeller, propeller blades secured in the hub, structure extending from said hub, other structure securable in a fixed position on an engine, bearing means between said extending structure and said other structure for rotatably supporting the propeller hub, and means for driving the hub through the structure extending therefrom, the extending structure including a rigid portion drivably engaged by said driving means and a radially flexible portion for isolating radial loads on the hub, due to centrifugal action of the propeller blades, from the bearing means.

3. The combination comprising, a rotatable hub for an aircraft propeller, propeller blades secured in the hub, structure extending from the hub having a radially flexible portion and another portion, other structure securable in a fixed position on an engine, bearing means between said extending structure and said other structure for rotatably supporting the propeller hub, means for driving the hub through the extending structure including a drive shaft and one part of a driving connection thereon, said another portion of the extending structure being rigid and having the other part of the driving connection thereon and in engagement with said one part.

4. In a mounting for a propeller of an aircraft engine; a rotatable hub including hub sockets extending radially outwardly therefrom; propeller blades; a radially extending stack of bearings rotatably securing each blade in a hub socket, each bearing stack extending substantially to the maximum radius of the hub socket and being at an average distance from the hub axis substantially corresponding to the hub radius; structure extending from and rotatable with the hub; other structure securable in a fixed position on the engine; a main bearing for rotatably supporting the propeller disposed between the said extending and said other structure at a radius from the hub axis greater than the said average distance to the bearing stacks and less than the distance from the hub axis to outer ends of the bearing stacks; said extending structure including a rigid portion in contact with the main bearing, and also a radially flexible portion between the hub and rigid portion for isolating loads on the hub, due to centrifugal action of the propeller blades, from the main bearing; and driving means operatively connected to said extending structure for rotating the hub.

References Cited in the file of this patent
UNITED STATES PATENTS

| 1,481,024 | Porter | Jan. 15, 1924 |
| 2,312,822 | Julien et al. | Mar. 2, 1943 |
| 2,727,577 | DeMuth | Dec. 20, 1955 |
| 2,810,443 | Doman | Oct. 22, 1957 |

FOREIGN PATENTS

| 583,118 | France | Oct. 25, 1924 |